United States Patent [19]
Fleisch et al.

[11] 4,045,090
[45] Aug. 30, 1977

[54] EASY-TO-ASSEMBLE STRUCTURE

[76] Inventors: William F. Fleisch, 126 Campbell Ave., Williston Park, N.Y. 11596; Walter Pousche, 58-05 Metropolitan Ave., Brooklyn, N.Y. 11237

[21] Appl. No.: 520,441

[22] Filed: Nov. 1, 1974

Related U.S. Application Data

[63] Continuation-in-part of Ser. No. 264,207, June 19, 1972, Pat. No. 3,845,988.

[51] Int. Cl.² .............................................. A47C 7/00
[52] U.S. Cl. .................................................. 297/440
[58] Field of Search .................. 297/158, 440, 445; 108/153, 159; 312/257 SK, 107, 111; 52/36; 248/DIG. 3

[56] References Cited

U.S. PATENT DOCUMENTS

| 891,143 | 6/1908 | Burns | 108/159 |
|---|---|---|---|
| 1,473,817 | 11/1928 | Gorsline | 312/257 SK |
| 2,678,088 | 5/1954 | Jamison, Jr. | 297/440 X |
| 2,796,158 | 6/1957 | Miles | 52/36 X |
| 2,998,107 | 8/1961 | Zimerla | 52/36 |
| 3,171,685 | 3/1965 | Hershberger et al. | 297/158 X |
| 3,193,231 | 7/1965 | Curry | 248/DIG. 3 |
| 3,278,149 | 10/1966 | Brucker | 248/DIG. 3 |
| 3,498,654 | 3/1970 | Diaz et al. | 312/257 SK |
| 3,545,625 | 12/1970 | MacMillan | 108/159 X |
| 3,658,381 | 4/1972 | Grant | 297/440 |

FOREIGN PATENT DOCUMENTS

| 1,930,901 | 12/1970 | Germany | 297/440 |
|---|---|---|---|
| 949,197 | 2/1964 | United Kingdom | 297/440 |

*Primary Examiner*—James T. McCall

[57] ABSTRACT

The structure comprises a tubular metal supporting frame; and a first and a second structural members carried on selected portions thereof. The second member is slidable along the frame to form a gravity-controlled locking engagement therewith and also to allow the first member to be placed in position thereby instantly completing the assembly of the structure.

27 Claims, 7 Drawing Figures

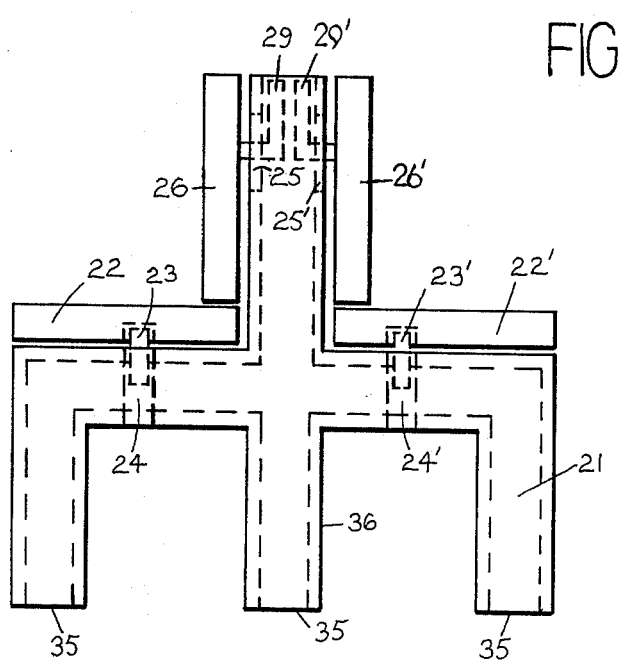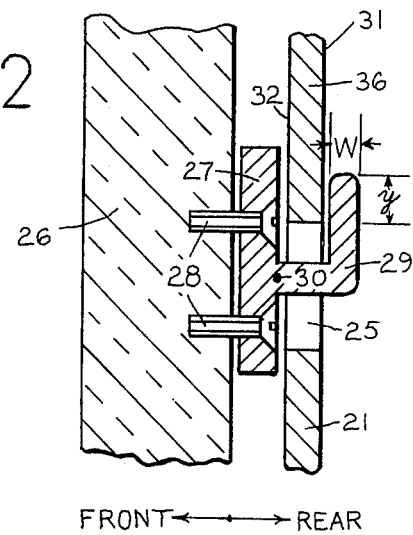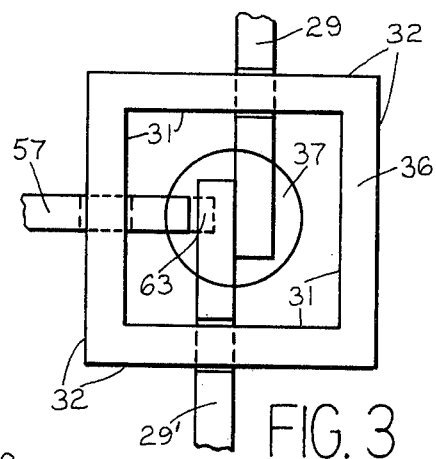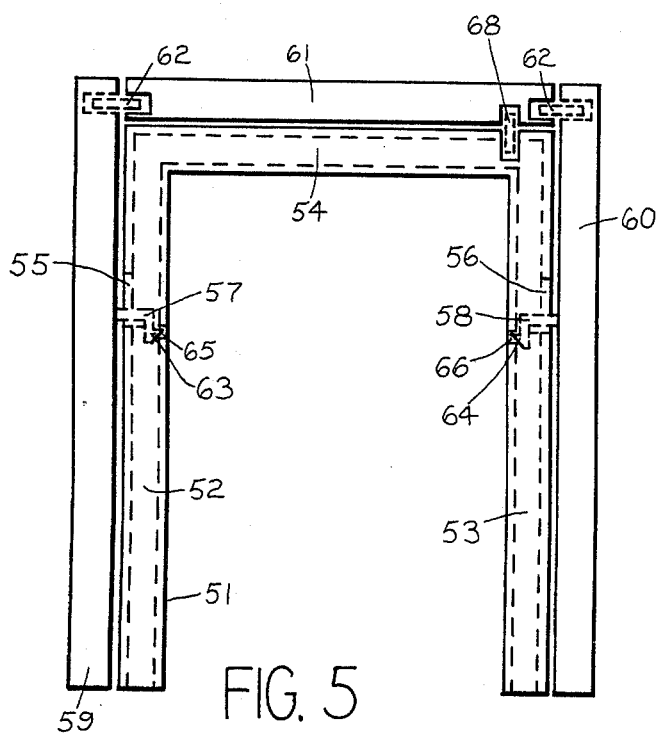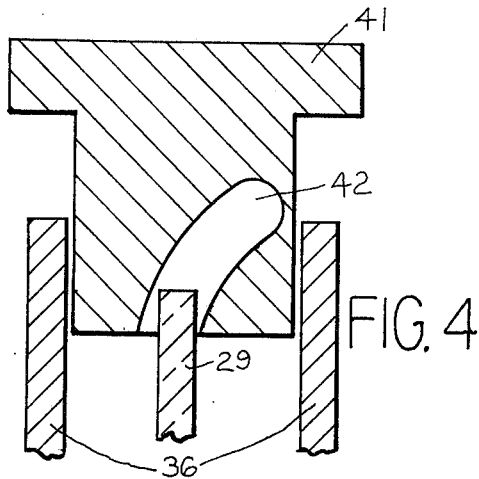

EASY-TO-ASSEMBLE STRUCTURE

CROSS-REFERENCE TO RELATED APPLICATION

This is a continuation-in-part of our pending application Ser. No. 264,207, filed June 19, 1972, now U.S. Pat. No. 3,845,988. We hereby incorporate this application by reference.

BACKGROUND OF THE INVENTION

The invention relates to easy-to-assemble structures, and more particularly to easy-to-assemble structures having gravity-controlled locking engagements between their components.

The invention has wide educational, household, commercial, industrial, . . . uses. While not limited thereto, it is herein described mostly in connection with a seat or bench, a (telephone or voting) booth, and a carrel-table assembly for the library study.

The ordinary library carrel-table assembly is very complicated in design but weak in structure. Usually the assembly is made of several pieces of ¾ inch plywood assembled together by means of angle irons, brackets, tension bolts, nuts, wood screws, and the like arranged in unsightly manners. The number of these fastening devices is amazingly large. Not infrequently, there are over 60 or 85 screws or bolts to be meticulously assembled into the structure. The assembling operation typically takes two skilled persons approximately 1½ hours. Often, these persons have to spend several hours just to understand the assembly instructions alone.

The steel bolts and screws are by no means the best fastening devices for the purpose. The wood between the screw threads are easily stripped. The hole for a screw is often enlarged, thereby loosening the screw grip and hastening the stripping process. This condition soon renders the screw useless as an effective fastening device. Load on the structure is then shifted, with increasing intensity, to the other screws or bolts. Again and again, the loosening and stripping processes are reinitiated with increasing rapidity until complete, catastrophic failure of the carrel occurs.

Many of the screws are often located in hard-to-reach places. They are often designed to intersect the plywood surfaces at acute angles far from 90°. Such designs invariably result in weak structural joints. In addition, the many angle irons, screws, bolts, and nuts used on the ordinary carrel often protrude out of the plywood. They are thus unsightly and unsafe. The weight of the numerous fastening devices is often another undesirable factor to consider.

In summary, the conventional carrel is complicated in design, weak in structure, heavy in weight and, furthermore, unsightly to see, unsafe to use, time consuming to assemble, and costly to install.

SUMMARY OF THE INVENTION

Therefore, to overcome the above and other difficulties, the general object of this invention is to provide improved structures readily assembled from their components.

Another object is to provide inexpensive, easy-to-assemble structures.

Another object is to provide easy-to-assemble structures having gravity-controlled, locking engagements between the components.

A further object is to provide light but strong, easy-to-assemble structures which are simple in design and pleasing in appearance.

Another object is to provide interchangeable and intermixable structural components to greatly enhance design flexibility.

Other objects and advantages, and a more complete understanding of the invention will become apparent from the following descriptions and claims, taken in conjunction with the accompanying drawing.

DESCRIPTION OF THE DRAWING

For the purpose of illustrating the invention, there is shown in the drawing the forms which are presently preferred. It is understood, however, that this inventon is not necessarily limited to the precise arrangements and instrumentalities here shown.

FIG. 1 shows a side view of a simple bench, or a back-to-back double bench according to the invention;

FIGS. 2 and 2A show details of the counter-gravity locks used in the bench of FIG. 1;

FIG. 3 is a top view of one of the tubular metal members, together with the metal hooks intruded from the sides into the tubular metal member and joined together by cement or other means;

FIG. 4 shows a bending die used to bend or twist the hooks, so as to secure permanent locking engagement of the structural components;

FIGS. 5 and 5A are, respectively, front and side views of a telephone booth showing the use of a gravity-locking engagement.

DESCRIPTION OF THE PREFERRED EMBODIMENTS

Figure 2A:
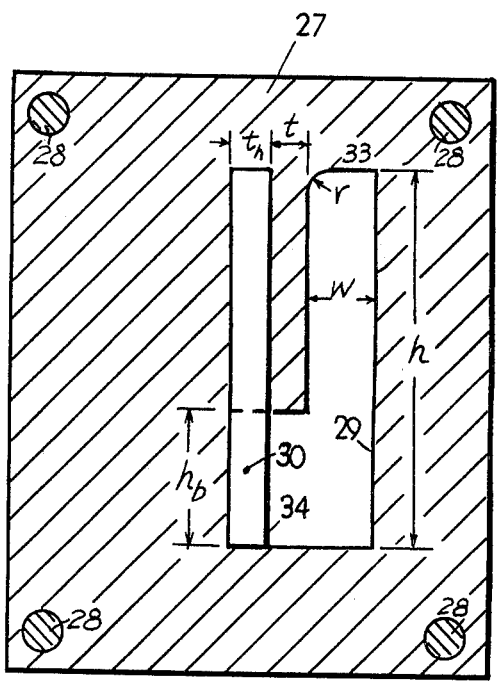

FIG. 1 shows a side view of an easy-to-assemble bench. A rigid framed supporting device 21 is first placed with its feet 35 on the ground but its vertical column or columns 36 (about 50 inches high) in upright positions. One or more of the feet 35 may have height-adjusting mechanisms, such as screws with bottom pads, to insure leveling of the bench. Preferably, the frame is made of rectangular or square metal tubes, such as 1½ inches × 1½ inches, 14 gauge cold-rolled, tubular steel. A horizontal seat member 22 made of plywood ¾ inch thick by 18 inches wide is to be placed on the top surface of the seating portion of the frame (at about 17 inches from the ground). This horizontal member 22 is prevented from moving horizontally, particularly away from the vertical columns 36, by a dowel or dowels 23, about ⅜ inch in diameter by ¾ inch long built into the underside of the horizontal member 22. The dowels 23 are adapted to engage matching holes 24 on the supporting device 21. Each of the vertical columns 36 has at least one vertical, narrow slot 25 made by punching, slitting, or other means (see FIG. 2). A vertical member 26 forming the back support of the bench and also made of ¾ inch plywood is next mounted in a vertical position against the column.

As shown in the enlarged view of FIG. 2, the vertical member 26 has one or more metal plates 27 (e.g., 12 gauge cold-rolled steel) secured to its back side by glueing or factory-inserted screws 28. Hooks 29 are partially cut or stamped out of the metal plates 27, and bent 90° at their bases 30, which are still connected to the metal plates 27. The 90° bending provides, for a given metal plate and tubular column, much greater steel-to-steel bearing surfaces and better joint strength than otherwise possible.

The hooks 29 in FIGS. 1 and 2 have open ends pointing upward, and are positioned to be all inserted simultaneously into the matching slots 25. Further, the hooks 29 and slots 25 form counter-gravity locking engagements to secure, against gravity, the vertical member 26 to the columns 36. By inserting the hooks 29 into the slots 25 and lifting the vertical member 26 relative to the frame 21, the rear part of the horizontal seat member 22 may be inserted directly below the lower edge of the vertical member 26 and, simultaneously, properly dowelled with the dowels 23. The insertion of the horizontal or seat member 22 prevents the vertical member 26 from falling under gravity out of the locking engagement. These simple procedures take two men only a few minutes' time to complete the assembly of the sturdy bench structure.

It is to be particularly noted that the hooks 29 have generally vertical sides to match the inside wall 31 and outside wall 32 of the tubular vertical columns 36. Further, there are substantially contacting regions $y$ (over $\frac{1}{8}$ inch high) between the hooks 29 and tubular metal walls 31 and 32. This insures a strong locking engagement. The thickness $t_h$ of hooks 29 is less than the width $t_s$ of the matching slots 25, preferably by only a few mils or less, so as to achieve high joint strength. The hooks 29 may even be thinner at their entrance edges 33, but thicker at their bases 30, than the width of the matching slots 25, so as to achieve interference fits. For this last application, the metal of the vertical columns 36 should preferably be strain-hardenable, such as iron, steel, or aluminum, in order to strain-harden and strengthen the metal around the slots 25 near the bases of the intruding hooks 29. The metal around the slot thus yields substantially to increase the slot width thereby accommodating the relatively oversized hooks 29 and achieving a very strong locking engagement.

If required, the above bench can be extended to any length by lengthening the supporting device 21, the horizontal seat member 22, and the vertical member 26. Alternately, the seat and vertical members, 22 and 26, can each be made of several segments of plywood pieces six or eight feet in length. For a short bench, say less than two feet, only one dowel 23 and a single locking engagement from a pair of slot and hook is needed. In this case, the vertical member 26 is adequately secured to the frame 21 by this locking engagement and also by having its lower edge bearing on the horizontal seat member 22. This seat member 22, meanwhile, is held in position by the vertical member 26 and dowel 23.

In most cases, however, two or more dowels 23 and hook-slot pairs are needed. It may even be desirable, particularly with tall vertical members 26, to have the hook slot pairs arranged in two or more horizontal rows. The details of this arrangement can be readily designed by any skilled persons in the art.

The framed supporting device 21 may be made of a single plastic or cement piece, with short pieces of metal tubes molded or cast in place to form the needed slots 25 at a given height level and specified horizontal distances apart. The same supporting device 21 can also be made of metal tubes joined together by, e.g., welding or brazing. This same device can even be made of two or more parallel, similar and spaced apart tubular frames. Each frame has at least one slot for engagement by a hook 29 secured on the vertical member 26, and also has a hole 24 for engagement by a dowel 23 secured on the horizontal members 22. Upon the completion of these engagements, these frames 21, the vertical member 26, and the horizontal seat member 22 are all assembled together into a strong, unitary bench structure.

Notice that in assembling the above bench, there are no screws or bolts to be selected, positioned, aligned, turned, . . . There are certainly no protruded bolts, nuts, or angle irons. There are also no metal parts to be seen or to cause personal injury, at least on the critical front side. The outer surfaces of the vertical member 26 and horizontal member 22 are not damaged or changed in the slightest manner. Artistic designs or color patterns on these surfaces will therefore be uninterrupted by screw holes, nuts, bolts . . .

As shown on the right side of FIG. 1, a second seat or bench arranged back-to-back to the previous seat may also be assembled on the same but extended supporting device 21. Needed here are only an additional horizontal seat member 22' with its attached dowel 23' to fit into hole 24', and another vertical member 26' with its attached hook 29' to engage with its matching slot 25' in the same vertical columns 36.

The hooks 29 and 29' may extend from opposite sides into the tubular columns 36 no further than the center of the tubes, so as to avoid possible interference during assembly (see horizontal hook 57 in FIG. 3). The same hooks 29 and 29' (FIG. 3) may be purposely extended farther than the center of the tubular columns 36 and horizontally offset to a degree so that they physically contact each other. This condition strengthens the assembled bench structure. To further increase the strength of the structure, the contacting edges on the hooks 29 and 29' may be positively joined together by means of a cement blob 37. According to one aspect of the invention, a cement consisting of an epoxy and a hardner is used. The contacting surface of one hook, e.g., hook 29, is coated with a layer of the hardener while the contacting surface of the other hook, i.e., 29', is coated with a layer of the epoxy. Such coated surfaces can be stored without change almost indefinitely, particularly if the cement components are surface sealed by very thin layers of plastics or metals. Upon assembly of the bench structure, however, these coated surfaces contact each other, the epoxy and hardener are mixed, and a strong cement joint is formed. The surface of the hooks 29 and 29' contacting the inside wall 31 and outside walls 32 of the tubular columns 36 can be similarly coated with an epoxy, while the surfaces of the walls 31 and 32 coated with the hardener, so as to achieve further strengthening of the assembled structure.

Another way to achieve a permanently assembled structure is to twist or bend the hooks 29 and 29', after they are inserted through the slots 25 and 25' into the tubular columns 36. The bending or twisting can be accomplished by means of a screwdriver or a pair of pliers. A more uniform and reliable way is to insert a bending die 41 into the vertical column 36. The die 41 fits snugly inside the tube and has, on its lower end, one or more special slots 42 to engage with the hooks 29 and 29', preferably simultaneously. When the top of the bending die 41 is hit, e.g., by a hammer, the hook 29 is twisted into the required shape in accordance with the design of the slot 42 and selection of the hook material. Once bent or twisted, the hooks 29 and 29' can no longer be taken out of the thin slots 25 and 25'. It is even possible to design an unbending die with special slots of a different shape to straighten the twisted hooks 29 and 29' for their removal from the slots 25 and 25' and for disassembly of the structure.

FIG. 5 shows a front view of a telephone booth comprised of two parallel, front and rear planar frames 51 made of 1½ inches × 1½ inches cold-rolled steel tubes. Each frame has two vertical columns 52 and 53 joined at their tops by a horizontal member 54. The vertical columns 52 and 53 have four vertical slots 55 and 56 (two on the front frame and two on the rear frame) for engagement with four hooks 57 and 58. These hooks are secured to the ¾ inch plywood, side panels 59 and 60. A horizontal top cover 61 made also of ¾ inch plywood is designed to rest on the horizontal members 54. The cover 61 also has four dowels 62 (two in front and two in the rear) to engage into holes drilled into the two side panels 59 and 60. The four hooks 57 and 58 here are similar in design to those of FIGS. 1 and 2 except that the four hooks are of the gravity-locking type. That is, the weight of the side panels 59 and 60 causes the hooks 57 and 58 to engage more closely with the slots 55 and 56, while simultaneously holding the top cover 61 in its proper position with the aid of the four dowels 62.

In assembling our telephone booth, the two tubular frames 51 are first set up, one at the front and one at the rear at a specified distance apart. The top cover 61 and the two side panels 59 and 60 are guided to come together with the dowels 62 halfway in their matching holes, and positioned relative to the frames 51 so that the top member 61 is assembled at the same time as the two side panels 59 and 60 are pushed down and locked by the hooking engagements the top cover 61 and the side panels 59 and 60, together with the tubular frames 51 and the dowels 62 and 68 are so relatively dimensioned as to have there between sufficient operating clearances to allow the assembly of the telephone booth in the above manner.

The top members 54 of the frames 51 should be about 7½ feet high and the horizontal distance between the two vertical columns 52 and 53 of the frames 51 should be about 2½ feet, to accomodate comfortably a standing person inside the assembled telephone booth. This horizontal distance should be increased to five or six feet if the assembled structure is to be used as a voting booth instead of as a telephone booth. The top members 54 may be lowered to about 30 inches if the structure is to be used as a table, with the side panel 59 and 60 standing either flush with the top table member 61 or a few feet higher to provide privacy for the person using the table. Similarly, the horizontal members 22 and 22' of the bench in FIG. 1 can also be raised from 17 inches to about 30 inches to provide a single, or double table.

The new table of FIG. 1 can even be turned 90° around a vertical axis in the column 36 and fitted into the structure of FIG. 5 to form a library carrel having two divided tables (i.e., the horizontal members 22 and 22'), a common book shelf (i.e., the top cover member 61), and two tall side panels 59 and 60 for privacy. Further, in this new library carrel only a single supporting device, rather than two, is needed. For example, only the two end frames 51 are needed each with two vertical columns 52 and 53. Each of these columns is provided with three vertical slots on its three sides for the hooks 29, 29', and 57 or 58. These hooks can also be inserted into the metal tubes to be bent or cemented together therein. Notice that the hooks 57 and 58 have fish-hooked tips with ⅛ inch lips 63 and 64 (FIGS. 3 and 5). When the side panels 59 and 60 are pushed down, these lips overjump the hooks 29 and 29', and lock them firmly in position (See FIG. 3). To release the hooks 29 and 29' from the lips 63 and 64, rods must be inserted through the holes 65 and 66 to push back the lips, and the side panels must be lifted simultaneously.

The assembly of the structures according to our invention takes two men only a few minutes. This represents savings in labor costs of over 90%. Further, in our units there are no angle irons, and no tension holding members which are weak and unreliable. Instead, most loads are now carried by the widely spread-out, bearing or compressive contact forces, either wood on wood or steel on steel. The gravity-controlled, locking engagements are particularly useful in our structures. Even the dowels do the job of both dowelling and locking.

It is easy to see that the gravity-controlled, hook-and-slot system of this invention can be used not only for such structures as chairs or benches, tables, telephone or voting booths, library carrel-table assemblies, shelves, movable furniture; but also for wall panelling, elevator interior panelling, partitions, home construction, fences, signs, and snow drift fences. In fact, the use of our novel structures is indeed very far-reaching.

Figure 5A:
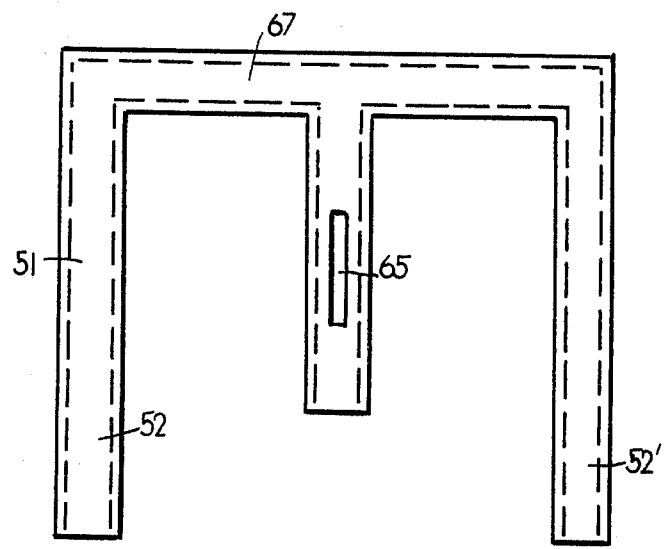

Not that the booth of FIG. 5 employs two (front and rear) non-standable but rigid supporting frames 51. These two rigid supporting frames may, however, be joined together into an integral supporting device by, e.g., left and right, horizontal connecting members 67. The result is the single, self-standing device of FIG. 5A. Each of the horizontal connecting members 67 may have a vertical tubular member 68 extending therefrom to provide a single slot 65 or 66 on each side. The top member 54 need not always be horizontal, but may be inclined at 15° or 30° to the horizontal for, e.g., table applications for draftsman.

The right end of the horizontal member 61 in FIG. 5 may be swiveledly anchored to the supporting device 51, by, e.g., a vertical dowel arrangement 68. The right panel 60 with the attached hook 58 and also the right dowel arrangement 62 may then be dispensed with. But the simplified structure can also be instantly assembled and disassembled, in quite a similar manner as the complete structure of FIG. 5. Such a simplified structure may be used, for example, as a table or department store shelf. The right panel 60 can also be considered or even made as part of the right column 32 or supporting device 51, with the horizontal dowel arrangement 62 provided thereon for pivotally anchoring the top member 61 thereto.

The rigid, supporting device 21 of FIG. 1 may or may not be self-standing. If not self-standing, the device 21 may comprise two (front and rear), three (front, intermediate, and rear), or more frames 21 of identical designs.

FIG. 2A shows some details of the hook 29 formed by, e.g., cutting the outline of the hook without detaching at position 30 from a (16 gauge) metal plate 27, and horizontally bending the cut-out portion 90° along a line 34 at the bottom 30 into the position shown. The thickness of the cut-out portion then forms the inner locking and outer locking edges of one side of the open end of the hook, with the remaining, uncut metal plate forming the other side of the open end. This open end has a width $w$ from ⅜ inch up, as shown in FIGS. 2 and 2A. The hook 29 also has a thickness $t_h$ which can be uniform or, for easy insertion into the slot 25, tapered from the front entrance edge 33 on the right to a thicker portion at the rear or bottom area 30. The thickness $t_h$ at the top edge and entrance edge 33 must be smaller than the slot width $t_s$, while $t_h$ at the bottom of the hook 29 may be even larger than $t_s$, to achieve interference fits as described previously. For uniform $t_h$, the difference $t_s - t_h$ generaly varies from 0.002–0.015 inch (preferably 0.005 inch) for tight fits, up to 0.015–0.035 inch (preferably 0.020 inch) for loose fits. The width $t$ of the open end of the hook 29 should be from −0.005 inch less (interference fits), through +0.003 inch (tight fits), to +0.020 inch (loose fits), than the thickness of the (sheet) metal plate 36. A rounded hook corner with radius $r =$ 0.010–0.025 inch is provided to facilitate the engagement of the hook 29 with the slot 25. The height of the hook 29 (for a typical case to carry 25 pounds) is about 1 ¾ inches. The top portion $y$ of the hook 29 contacting the tubular frame wall 36 varies from ¼ inch up, preferably over ⅜ inch. The front surface of the ¾ inch plywood, vertical member 26 may be coutersunk so that it is substantially flush (or coplanar) with the front surface of metal plate 27. This arrangement allows the rear surface of the tubular metal wall 36 to bear directly against the same front surface thereby further strengthening the locking engagement.

The invention is not to be construed as limited to the particular forms disclosed herein, since these are to be regarded as illustrative rather than restrictive.

We claim:

1. An assembled structure comprising:
   a supporting device containing therein wall means which defines and elongated slot system and having a first supporting surface and a second supporting surface in angular relation with the first supporting surface;
   a first structural member having a first contact surface engageable with the first supporting surface;
   a second structural member having a second contact surface engageable with the second supporting surface so as to be adjacent to, and disposed in angular relation with, the first member;
   a connecting means for connecting a selected portion on the first member to an adjacent portion on the second member; and
   locking means comprising a hook system securing the first member in gravity-controlled, locking engagement with the slot system on the supporting device;
   the location of the second member in its intended position on the assembled structure preventing the disruption of the locking engagement of the first member with the slot system on the supporting device;
   the first and second structural members, together with the supporting device and the connecting means being so relatively dimensioned as to have therebetween operating clearances so substantial that upon the selected portion on the first member being connected by the connecting means to the adjacent portion on the second member and simultaneously upon aligning the locking means with the slot system, the hook system is insertible into the slot system and subsequently slidable therealong whereby the second contact surface on the second member is made to engage with the second supporting surface at substantially the same time the first contact surface on the first member is made to engage with the first supporting surface so that the locking engagement is achieved and the assembly of the structure is substantially instantly completed.

2. The structure of claim 1 wherein the supporting device comprises a pair of rigid, spaced apart supporting frames.

3. The structure of claim 1 wherein the locking engagement is of the gravity-locking type, the weight of the first member tending to strengthen the locking engagement.

4. The structure of claim 1 wherein the slot system comprises a slot and the locking means comprises a plate secured to the first member and having two major surfaces thereon, a portion of the plate being cut out in the outline of an open-ended hook and bent up about 90° along a line still attached to the plate so that the thickness of the cut-out and bent-up portion forms the outer and inner edges of one side of the open end of the hook,
   the remaining, uncut plate forming the other side of the open end of the hook.

5. The structure of claim 4 wherein the sides of the open end of the hook contact the two major surfaces of the plate material portion for a height no less than ⅜ inch.

6. The structure of claim 4 wherein the width of the open end of the hook is greater than the thickness of plate material portion by a difference of no more than 20 mils.

7. The structure of claim 4 wherein at least part of the open end of the hook is distorted to prevent its being unhook from the slot.

8. The structure of claim 4 wherein the thickness of the open end of the hook is less than the width of the slot by a difference of no more than fifteen mils.

9. The structure of claim 4 wherein the open end of the hook has a entrance edge thinner than the slot width but also has a base near the bend line thicker than the slot width so as to achieve an interference fit when the hook is fully inserted into the slot.

10. The structure of claim 9 wherein the plate material portion comprises a strain-hardenable material so that the material around the slot is strain-hardened and strengthened after the interference fit is formed.

11. The structure of claim 4 including means for joining the hook to the plate material portion.

12. The structure of claim 11 wherein the joining means comprises a cement having an epoxy and a hardener as its two components,
   the inner or locking edge of the open end of the hook being coated with one of the two components while the surface of the plate material portion contacting the hook being coated with the other cement component so that the components react upon assembly of the structure.

13. An open-ended hook for locking engagement thereof with a structural member having thereon an elongated slot through which the hook can be inserted and along which the hook can be moved to thereby lockingly engage the hook with the member,
   said slot terminating at one end thereof into a portion of the structural member having thereat an internal hook bearing surface and an external hook bearing surface,
   said two bearing surfaces being generally parallel to each other and defining therebetween the wall thickness of the structural member,
   the hook being insertible into the slot and the hook open end being subsequently slidable along the internal and external bearing surfaces on the member, comprising:
   a plate having a portion thereof partially cut out in the outline of one side of the open end of the hook,
   said cut-out portion being bent up from the plate about 90° along a line of the cut-out portion still attached to the plate so that the thickness of the cut-out portion forms the inner and outer edges of the one side of the open end, the remaining, uncut plate forming the other side of the open end of the hook.

14. The hook of claim 13 wherein the slot has a constant width and the hook has a front entrance edge thinner than the slot width but also has a rear edge thicker than the same width so as to form an interference fit when the hook is inserted into the slot.

15. The hook of claim 13 wherein the outer edge of the open end has a fish-hook lip, and the member has a second slot to lockingly engage therewith.

16. The structure of claim 1 including wall means defining a hole in the second member and wherein said connecting means engages the second member by means of the hole.

17. The structure of claim 1 wherein the supporting device comprises a support member having therein a plate material portion which has two major surfaces, the slot system extending in and across the plate material portion to terminate at the two major surfaces thereof.

18. The structure of claim 1 including a second connecting means for connecting the second member to the supporting device.

19. The structure of claim 18 including wall means defining a hole in the second contact surface of the second member and wherein said second connecting means engages the second member by means of the hole.

20. The structure of claim 18 wherein the connecting means comprises a dowel.

21. The structure of claim 2 wherein both of the two supporting frames are self-standing.

22. The structure of claim 1 wherein the hook system is slidable but not shiftable.

23. The structure of claim 4 wherein the height of the slot system is greater than the length of the cut-out and bent-up portion to allow the insertion of the hook open-end into the slot system.

24. The hook of claim 13 wherein the open end of the hook has two contact surfaces no less than $\frac{3}{8}$ inch in length and defined by the thickness of the plate for respectively contacting the two bearing surfaces.

25. The hook of claim 24 wherein the distance between the two contact surfaces is greater than the wall thickness by a difference of no more than twenty mils.

26. The hook of claim 13 wherein the thickness of the plate is less than the width of the slot by a difference of no more than 15 mils.

27. The hook of claim 13 including means for joining the hook to the structural member.

* * * * *